United States Patent [19]

Chamran et al.

[11] 4,342,516

[45] Aug. 3, 1982

[54] FILTER INDEXING FOR SPECTROPHOTOMETER SYSTEM

[75] Inventors: Morteza M. Chamran, Elmhurst, Ill.; Larkin B. Scott, Fort Worth, Tex.; Paul B. Williams, Lombard, Ill.

[73] Assignee: The Perkin-Elmer Corporation, Norwalk, Conn.

[21] Appl. No.: 128,030

[22] Filed: Mar. 7, 1980

[51] Int. Cl.³ ............................. G01J 3/12; G01J 3/18
[52] U.S. Cl. ...................................... 356/332; 356/328; 356/334
[58] Field of Search ............... 356/326, 328, 329, 332, 356/333, 334

[56] References Cited

U.S. PATENT DOCUMENTS 3,537,797 11/1970 Matthews .................... 356/334 X
3,822,941 7/1974 Roche et al. .................. 356/334

OTHER PUBLICATIONS

"Computer-Controlled Programmable Monochromator System with Automated Wavelength and Background Correction," Spillman et al., Anal. Chemistry, vol. 48, No. 2, Feb. 1976, pp. 303-311.

Primary Examiner—Vincent P. McGraw
Attorney, Agent, or Firm—S. A. Giarratana; E. T. Grimes; R. A. Hays

[57] ABSTRACT

A spectrophotometer system has an optical system for transmitting a beam from a source at select wavelengths onto a detector. A plurality of filters are positioned in a tray. A stepper mechanism indexes the tray along a path. A microcomputer controls the stepper mechanism and the optical system. The wavelength is successively changed over a range, the tray is indexed to move a select filter into the beam at a predetermined wavelength and the changing is discontinued during indexing.

8 Claims, 3 Drawing Figures

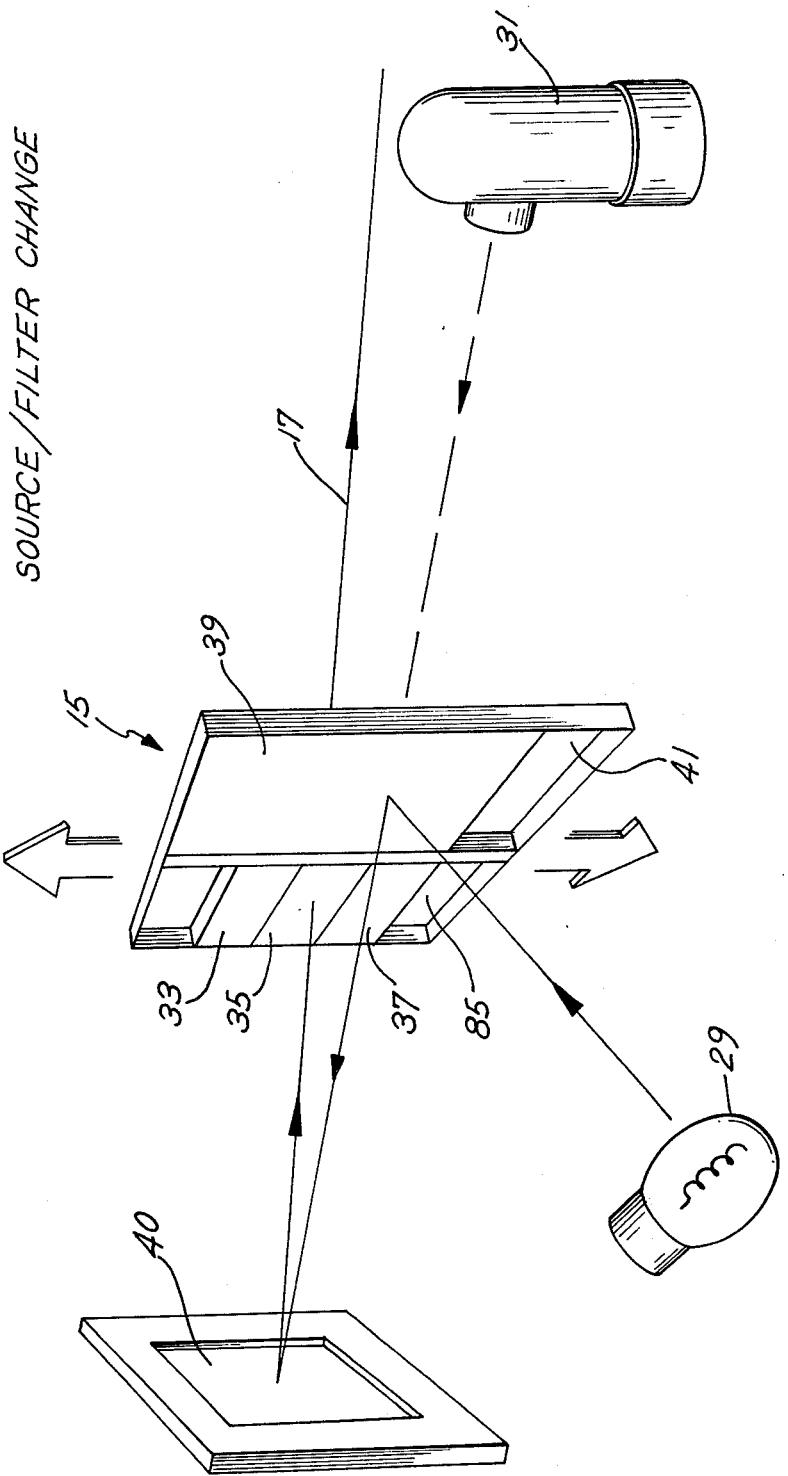

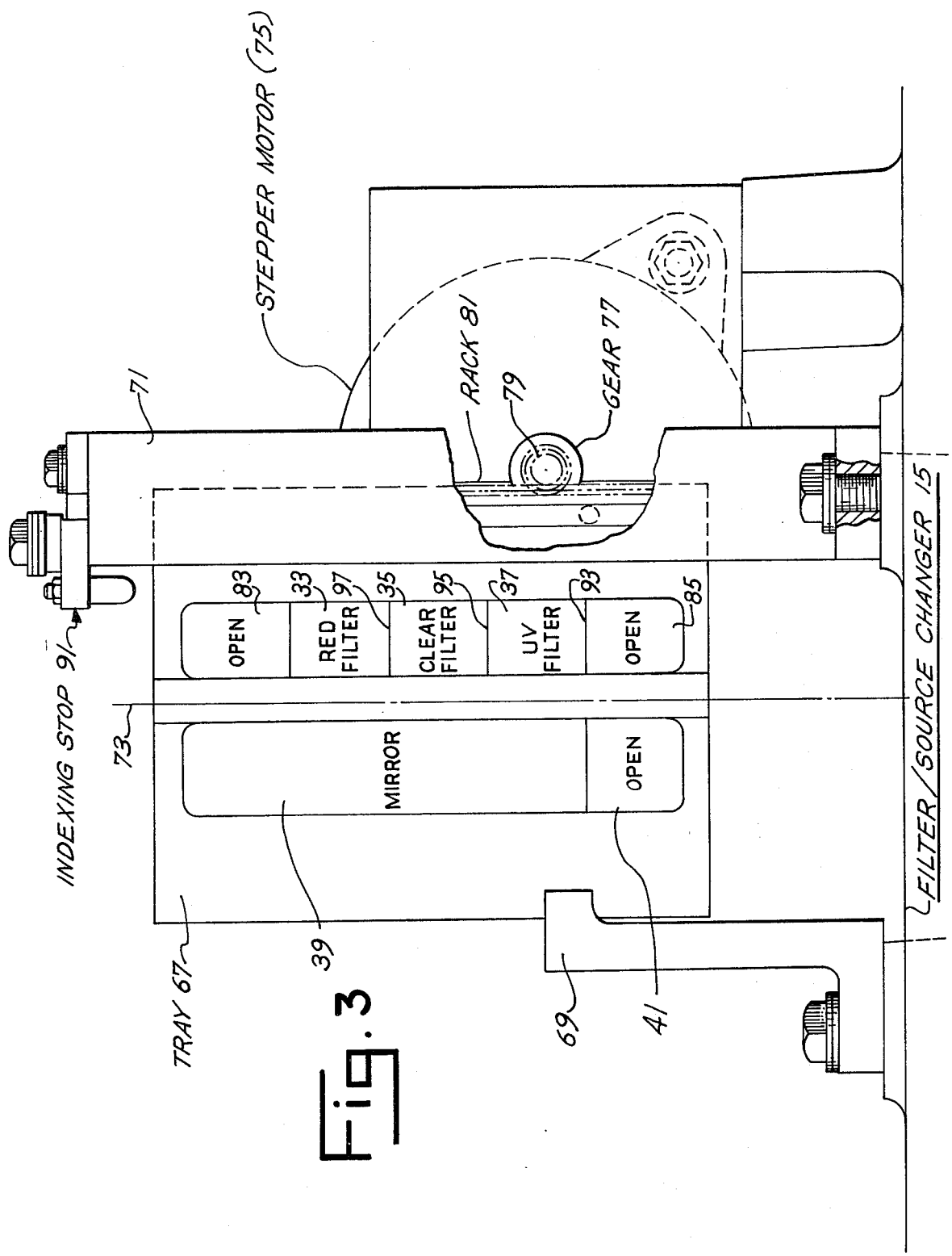

FILTER INDEXING FOR SPECTROPHOTOMETER SYSTEM

RELATED PATENT APPLICATIONS

This application is related to the following four U.S. Patent Applications filed on even date herewith: (1) Ser. No. 128,029, entitled *MANUAL WAVELENGTH ADJUSTMENT FOR A MICROPROCESSOR BASED SPECTROPHOTOMETER*, by Larkin B. Scott, Morteza M. Chamran, and Paul B. Williams; (2) Ser. No. 128,027, entitled *SPECTROPHOTOMETER IMPROVEMENT OF IMPROVED AUTOMATIC WAVELENGTH INDEXING INITIALIZATION APPARATUS* by Morteza M. Chamran, Larkin B. Scott and Paul B. Williams; (3) Ser. No. 128,028, entitled *SAFE MEMORY SYSTEM FOR A SPECTROPHOTOMETER*, by Paul B. Williams, Larkin B. Scott and Morteza M. Chamran; and (4) Ser. No. 128,289, entitled *A SPECTRO-PHOTOMETER SYSTEM HAVING POWER LINE SYNCHRONIZATION*, by Morteza M. Chamran, Larkin B. Scott, Paul B. Williams and M. A. Ford.

BACKGROUND OF THE INVENTION

This invention relates to a spectrophotometer, and more particularly, to a spectrophotometer system having an improved filter and source changer.

In the past, spectrophotometers have typically had continuously driven filters placed end-to-end each having a length proportional to the spectral range to be utilized with the filter. Thus, a filter for a spectral range of 100 nanometers has been twice as long as a filter for a spectral range of 50 nanometers, and only one-tenth as long as a filter for a range of 1,000 nanometers. While these filters have been somewhat satisfactory, some of the filters have been cumbersome due to their great lengths, and some imprecision in data has occurred because of filter characteristic variations along the lengths of the filters. Imprecision has also occurred at data points corresponding to the boundaries of adjacent filters.

SUMMARY OF THE INVENTION

A principal object of this invention is to provide an improved spectrophotometer.

Another object of the invention is to provide a spectrophotometer having an improved filter and source changer.

Another object of the present invention is to provide a spectrophotometer having an improved filter and source changer with a plurality of filters for independent presentation to a beam of radiant energy.

Another object of the invention is to provide a spectrophotometer having an improved filter and source changer with a microcomputer for controlling the filter and source changer.

Another object of the invention is to provide a spectrophotometer having an improved filter and source changer wherein the filters and sources being utilized are determined by the wavelength being transmitted.

Another object of the invention is to provide a spectrophotometer having an improved filter and source changer with a microcomputer which stops all data handling activities and recording activities during changes of filter and source.

Another object of the invention is to provide a spectrophotometer having an improved filter and source changer which has a mechanical indexing stop for initialization of the changer without a slip clutch or optical sensor.

Thus, in a principal aspect, the present invention is a spectrophotometer system comprising a radiant energy source, an optical system, a filter tray, a plurality of filters, stepper means and microcomputer means. The source generates a beam of radiant energy, and the optical system transmits the beam at select wavelengths through a sample cell and onto a detector. The filter tray is movably mounted for movement along a path. The filters are positioned in the tray for movement through the beam of radiant energy as the filter tray is moved along the path; the filters are positioned on the tray for independent presentation in the beam. The stepper means indexes the tray in discrete steps along the path. The microcomputer means controls the optical system and the stepper means. The optical system is controlled for successively changing the wavelength of the beam of radiant energy over a predetermined spectral range, and for discontinuing the changing of the wavelength during indexing of the tray. The stepper means is controlled for indexing the tray of plurality of steps for moving a select filter into the radiant energy beam at a predetermined wavelength of the spectral range.

BRIEF DESCRIPTION OF THE DRAWING

The preferred embodiment of the present invention is hereinafter described with reference to the accompanying drawing, wherein:

FIG. 2 is a schematic, perspective view of the radiant energy source, filter/source change system and reflection surface of the preferred embodiment; and FIG. 3 is an elevation view of the filter/source change system of the preferred embodiment.

DESCRIPTION OF THE PREFERRED EMBODIMENT

Figure 1:
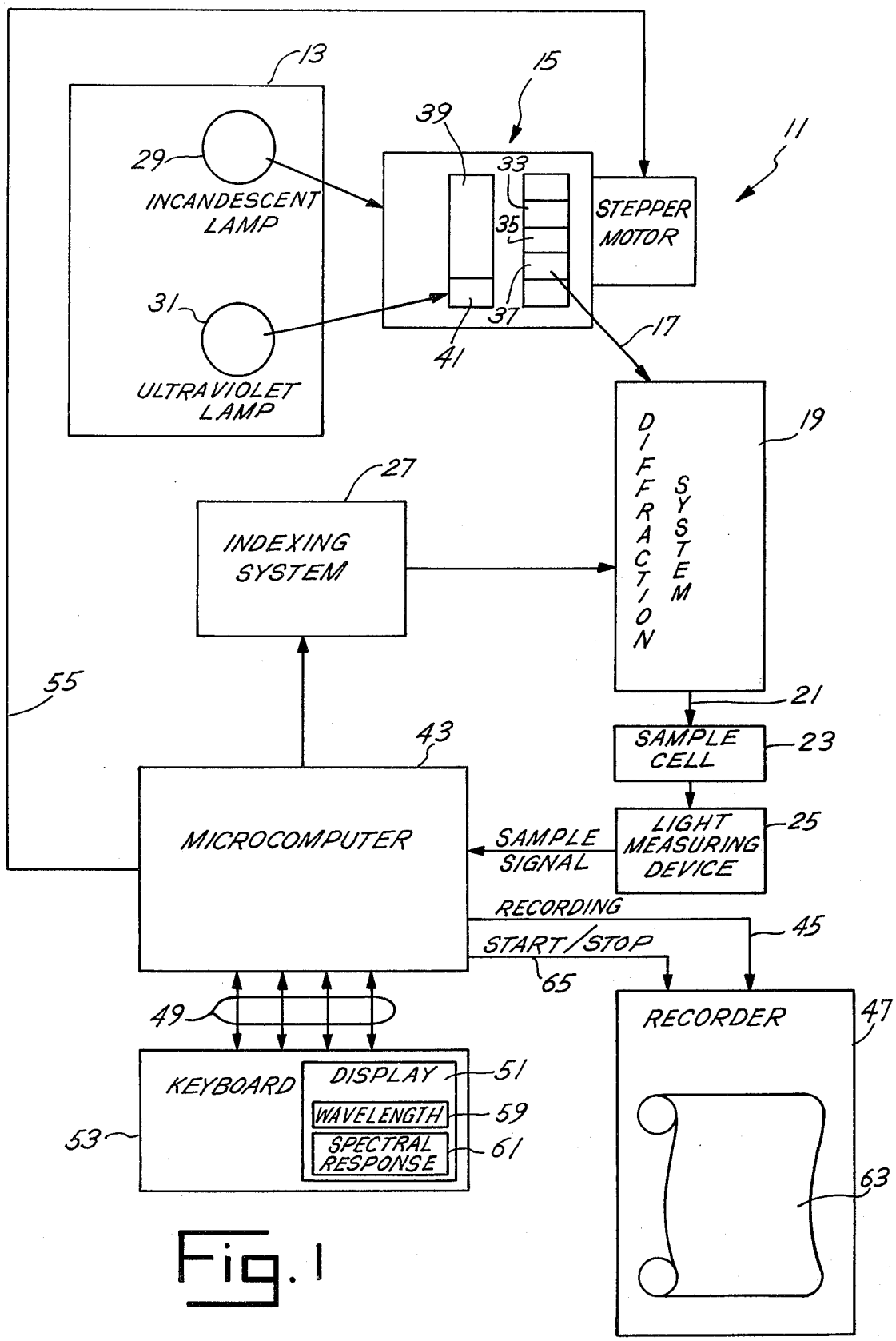
FIG. 1 is a schematic view of the preferred embodiment.

The above related application disclose specific apparatus of the features broadly described herein, and such applications are incorporated herein by reference. Specific apparatus necessary for understanding the preferred embodiment of the present invention are described as follows.

Referring to FIG. 1, a spectrophotometer system 11 includes a radiant energy source 13 positioned in relation to a filter source change system 15 for transmitting a beam of radiant energy 17 through an optical diffraction system 19. Diffraction system 19 generates a beam 21 of monochromatic radiant energy (hereinafter monochromatic light) which is directed through a sample cell 23 and onto a light measuring device 25. Measuring device 25 generates an output sample signal as the measure of the radiant energy passing through the substance contained in sample cell 23, hereinafter referred to as the spectral response of light measuring device 25. An indexing system 27 controls diffraction system 19 for changing the wavelength of the monochromatic light in sequence over a predetermined spectral range.

Radiant energy source 13 comprises an incandescent lamp 29 and a deuterium lamp 31 for generating radiant energy along separate optical paths for independently forming energy beam 17 in accordance with control filter system 15 (as seen more clearly in FIG. 2). The filter system 15 controls the generation of beam 17 by lamps 29, 31, so that deuterium lamp 31 is utilized during generation of wavelengths of 314 nanometers and shorter, and incandescent lamp 29 is utilized during generation of wavelengths of longer than 314 nanometers.

Filter source changer 15 includes a first vertical array of near infrared filter 33, a clear filter 35 and an ultraviolet filter 37, which are independently positionable with respect to beam 17 for filtering the beam at different wavelength generations of optical system 19. A second vertical array of a mirror surface 39 and an opening 41 controls the path of deuterium lamp energy with respect to formation of beam 17, as described hereinafter.

A conventional microcomputer 43 controls the overall system processing and management of the spectrophotometer system 11. The microcomputer performs a number of tasks which may be summarized as follows:

(1) data is received from the light measuring device 25 in the form of an analog signal which is converted to a digital signal for processing; the processed digital signal is converted to an analog recording signal for output along a bus 45 to a recorder 47; the processed digital signal also is converted to display data for output along a bus 49 to a keyboard display 51.

(2) instructional information is received from a keyboard 53 and is manipulated to provide output commands to indexing system 27 for sequencing diffraction system 19 through a spectral range;

(3) other display data is generated and transmitted to display device 51 for visually displaying an indication of the particular wavelength of the monochromatic beam passing through sample cell 23; and (4) control data is generated and transmitted to filter system 15 via a bus 55 for controlling the formation of beam 17.

Microcomputer 43 is a conventional 8-bit, parallel bus microcomputer having an accumulator, a plurality of registers, an instruction register and a CPU control for interpretation and execution of micro-level assembly language instructions; a memory system including random access memory and read-only memory is also included in microcomputer 43, as will be understood. The microcomputer treats recorder 47, keyboard 53 and display device 51 as peripheral devices which are interconnected by means of bus cables.

One suitable microprocessor for use in microcomputer 43 is a Motorola MC6802. Reference is made to Motorola manual ADI-436 which describes the MC6802, and reference is made to "Introduction to Microprocessors," by Herve Tireford of Motorola Semiconductor Products, Inc., 1975.

The system is managed under the control of keyboard 53 permitting the operator to instruct the microcomputer with select commands. For example, the spectral range over which the monochromatic beam is to be sequenced (scanned) may be selected from the keyboard, as well as the selection of a particular wavelength which the system is to generate. The keyboard may also be used for instructing the rate of scanning by indexing system 27 and for instructing the microcomputer to perform various spectrophotometer analyses, as for example, transmittance, absorption, concentration and wavelength calibration.

The display 51 may be formed in the keyboard for providing a display location for the microcomputer to communicate visually with the operator. Display 51 includes a wavelength display section 59 for displaying an indication of the wavelength of light passing through sample cell 23. A spectral response display section 61 is also provided on display 45 for providing an indication of the analytical results computed from the response of light measuring device 25 to the monochromatic light having the wavelength identified in display section 59.

Recorder 47 includes a motor (not shown) for driving a paper web 63 upon which information is recorded according to the results of the spectrophotometer analysis. Microcomputer 43 communicates with recorder 47 along a data bus 65 for transmitting a START or a STOP signal to recorder 47 for controlling movement of paper web 63. A recording signal is generated along bus 45 for controlling deflection of the recorder element (not shown) of recorder 43 for providing a graphical recording of the spectral response on paper web 63.

Referring to FIG. 3, filter source 15 is illustrated in more detail showing a filter tray 67 positioned between a pair of side support members 69, 71 for guiding movement of tray 67 along a vertical path 73. A stepper motor 75 moves filter tray 67 in discrete steps via a pinion gear 77 secured to a drive shaft 79 of stepper motor 75. Stepper motor 75 drives filter frame 67 up or down as pinion gear 77 meshes with a gear rack 81 carried along one side of filter tray 67.

Filter tray 67 carries red filter 33, clear filter 35 and ultra-violet filter 37 in a vertical array for successively and independently presenting a separate filter in the radiant energy beam path by movement of stepper motor 75. A pair of openings 83, 85 are formed in the tray adjacent respective filters 33, 37. The filter tray also includes mirror 39 and opening 41 set in a vertical array, horizontally spaced from the vertical array of filters 33–37.

When the system is turned on, filter tray 67 is moved to an initialized position by stepper motor 75 driving tray 67 upwards until it abuts an indexing stop 91. Microcomputer 43 sends a drive signal composed of a plurality of stepping pulses to stepper motor 75 for movement of tray 67 against stop 91 where it is held until stepper motor 75 no longer receives driving pulses from the microcomputer. No slip clutch or optical sensor is used to position tray 67 to its initialized position. During initialization, wavelength is also initialized at the appropriate end of the wavelength drive mechanism range by command from the microcomputer, as discussed more fully in U.S. patent application Ser. No. 128,027, previously referred to. This simultaneous initialization of filter tray and wavelength provides the proper start for wavelength and filter indexing.

From this initialized position, microcomputer 43 will move filter tray 67 downwardly along path 73 into predetermined positions for placement of filters 33–37 in the radiant energy beam 17 at select times. The positioning of filter tray 67 is synchronized by microcomputer 37 with its indexing of diffraction system 19. For a change in wavelength of system 19 requiring a filter change or lamp change, stepper motor 75 is actuated by the microcomputer to make the appropriate change in position of filter tray 67. Thus, the location of each of filters 33–37, mirror 39 and aperture 41 on filter tray 67 and the location of indexing stop 91 with respect to beam 17 are predetermined so that microcomputer 43 may transmit a certain number of stepping pulses along bus 55 for each change in position required of tray 67.

Tray 67 is positioned during wavelength scanning so that red filter 33 filters beam 17 during generation of wavelengths of 900 nanometers through 638 nanometers, clear filter 35 filters beam 17 for generation of wavelengths of 637 nanometers to 390 nanometers, and ultra-violet filter 37 filters beam 17 during generation of wavelengths of 389 nanometers to 314 nanometers. For wavelengths shorter than 314 nanometers, the deuterium lamp 31 is utilized without a filter for forming energy beam 17. Radiant energy from deuterium lamp 31 passes through opening 41, reflects from a reflection surface 40 (FIG. 2) positioned behind tray 67 and passes back through opening 85 to form energy beam 17.

As the tray moves through the radiant energy beam, the beam must cross the leading edge 93 and trailing edge 95 of ultra-violet filter 37, and the beam must cross the leading edge 97 of infrared filter 33. Rather than stepping tray 67 in a continual movement in synchronism with wavelength scanning, the microcomputer moves a filter into position for use at a plurality of wavelengths and simultaneously discontinues all data handling activities until the tray has moved from one filter to the next. During this interval in which filters are changed, microcomputer 43 generates a STOP signal along output bus 65 to recorder 47 for stopping movement of paper 63. Likewise, microcomputer 43 discontinues indexing the wavelength being displayed on display 51.

It should be understood, of course, that the foregoing disclosure relates to a preferred embodiment of the invention and that modifications or alterations may be made therein without departing from the spirit or scope of the invention as set forth in the appended claims.

What is claimed is:

1. A spectrophotometer system comprising a first radiant energy source and a second radiant energy source for generating a beam of radiant energy, an optical system for transmitting the beam of radiant energy at preselected wavelengths through a sample cell and onto a detector, the combination further comprising:
    a filter tray movably mounted for movement along a path, said filter tray including control means for selecting the source of radiant energy to be transmitted depending on the position occupied by said tray;
    a plurality of filters positioned in said tray for movement through the beam of radiant energy as said filter tray is moved along said path, said filters being positioned on said tray for independent presentation in said beam;
    stepper means for indexing said tray in discrete steps along said path and
    microcomputer means for controlling said optical system for successively changing the wavelength of the beam of radiant energy over a predetermined spectral range, and said microcomputer means including means for selecting any limited wavelength range to scan within the larger spectral range of the system, said microcomputer means being connected to said stepper means for indexing said tray a plurality of steps for moving a select filter into the radiant energy beam and for selecting the source of radiant energy at only predetermined wavelengths of said spectral range, said microcomputer means being caused to discontinue changing said wavelength during indexing of said tray.

2. A spectrophotometer system according to claim 1 and further including:
    recorder means for recording an indication of the results computed from the response of said detector, said recorder means having an area of record receiving material and a motor means for driving traversing said area, and wherein said microcomputer means electrically communicates with said motor means for stopping recording on said area of record material during indexing of said tray.

3. A spectrophotometer system according to claim 1 and further including:
    display means operationally controlled by said microcomputer means for visually displaying an indication of the wavelength of the radiant energy beam being transmitted by the optical system; and
    wherein said microcomputer means electrically communicates with said display means for indexing the visual display in relation to each said change in wavelength of the energy beam.

4. A spectrophotometer system according to claim 1 wherein said plurality of filters includes an ultra-violet filter and a red filter.

5. A spectrophotometer system according to claim 1, wherein said radiant energy source includes an incandescent lamp for generating radiant energy and a deuterium lamp for generating radiant energy; and wherein said filter tray includes control means operable when said tray occupies a preselected range of positions along said path for transmitting radiant energy from said deuterium lamp to said optical system; and
    wherein said microcomputer means indexes said tray to said preselective range of positions at predetermined wavelengths of said spectral range.

6. A spectrophotometer system comprising:
    first and second source means for generating a radiant energy beam;
    filter means comprising at least a first filter and a second filter, a filter and source changer for independently presenting a separate one of said first and second filters to a position for filtering said radiant energy beam and for selecting one of said first and second source means for generating a radiant energy beam;
    an optical system including a diffraction means for receiving said radiant energy beam and for generating monochromatic radiant energy, said optical system responsive to a wavelength control signal for sequencing the wavelength of said monochromatic radiant energy over a predetermined spectral range;
    detection means positioned for receiving said radiant energy transmitted by said optical system and responsively producing a sample signal;
    recorder means for recording information carried by said sample signal for generating a record of the results computed from the response of said detection means; and
    microcomputer means for transmitting said wavelength control signal to said optical system for sequencing said wavelength, and for actuating said filter and source changer, and said microcomputer means including means for selecting any limited wavelength range to scan within the larger spectral range of the system, said microcomputer means discontinuing transmission of said wavelength control signal during actuation of said filter means to present a separate filter to said position.

7. A spectrophotometer system according to claim 6 and further including a mechanical indexing stop, the microcomputer means being further programmed for controlling the stepper means to index the tray to the stop when establishing an initial position of the wavelength control means.

8. A spectrophotometer system according to claim 1 or claim 5 wherein said control means includes a mirror section and a light permeable section on said filter tray positionable in the radiant energy paths from said radiant energy sources for selecting the source of radiant energy to be transmitted.

* * * * *

UNITED STATES PATENT AND TRADEMARK OFFICE
CERTIFICATE OF CORRECTION

PATENT NO. : 4,342,516

DATED : August 3, 1982

INVENTOR(S) : Morteza M. Chamran et al.

It is certified that error appears in the above-identified patent and that said Letters Patent are hereby corrected as shown below:

Column 2, line 67, change "with control" to --with control by--.

Column 6, line 4, change "means for driving" to --means for--.

Signed and Sealed this

Eighth Day of February 1983

[SEAL]

Attest:

GERALD J. MOSSINGHOFF

Attesting Officer

Commissioner of Patents and Trademarks